United States Patent [19]

Metcalf et al.

[11] Patent Number: 4,663,985
[45] Date of Patent: May 12, 1987

[54] SHAFT RELATIVE SPEED LIMITING SYSTEM

[75] Inventors: Jeffrey D. Metcalf, Rockford; Gary D. Gillingham, Cherry Valley, both of Ill.

[73] Assignee: Sundstrand Corporation, Rockford, Ill.

[21] Appl. No.: 837,251

[22] Filed: Mar. 7, 1986

[51] Int. Cl.$^4$ .................. F16H 37/06; F16H 1/44
[52] U.S. Cl. .................. 74/661; 74/675; 74/711
[58] Field of Search .......... 74/675, 711, 781 R, 74/782, 661, 665 A, 665 B, 665 E; 244/213, 194

[56] References Cited

U.S. PATENT DOCUMENTS

| | | | |
|---|---|---|---|
| 2,780,893 | 2/1957 | Seborg et al. | 74/675 X |
| 2,873,620 | 2/1959 | Sinclair | 74/661 |
| 2,950,086 | 8/1960 | Abraham | 254/173 |
| 3,782,223 | 1/1974 | Watson | 74/661 X |
| 4,188,837 | 2/1980 | Bendall | 74/661 X |
| 4,219,107 | 8/1980 | Ford | 188/134 |
| 4,260,121 | 4/1981 | Baston et al. | 74/711 X |
| 4,493,479 | 1/1985 | Clark | 254/274 |

FOREIGN PATENT DOCUMENTS

| | | | |
|---|---|---|---|
| 1076451 | 2/1960 | Fed. Rep. of Germany | 74/661 |
| 1364059 | 12/1964 | France | 74/675 |
| 2460425 | 2/1981 | France | 74/711 |
| 378640 | 7/1964 | Switzerland | 74/675 |
| 323559 | 1/1930 | United Kingdom | 74/675 |

Primary Examiner—Leslie Braun
Assistant Examiner—D. Wright
Attorney, Agent, or Firm—Wood, Dalton, Phillips Mason & Rowe

[57] ABSTRACT

In order to avoid a large torque spike in a system in the event of a system failure, a shaft relative speed limiting system includes a lost motion device and a brake. The lost motion device is operatively associated with a pair of shafts normally driven at selected speeds such that one of the shafts drives the other of the shafts in the event of a system failure. The brake is operatively associated with the pair of shafts normally driven at selected speeds through first and second portions of a relative speed limiting device and limits the relative speed between the shafts in the event of a system failure. Additionally, the first portion of the relative speed limiting device is normally driven by one of the shafts at the selected speed thereof and the second portion of the relative speed limiting device is normally driven by the other of the shafts at the slected speed thereof in the shaft relative speed limiting system.

31 Claims, 2 Drawing Figures

SHAFT RELATIVE SPEED LIMITING SYSTEM

FIELD OF THE INVENTION

This invention relates to a shaft relative speed limiting system and, more particularly, to a device for limiting the relative speed between shafts in the event of a system failure.

BACKGROUND OF THE INVENTION

In many systems, a pair of shafts normally are driven at a selected speed or speeds. However, should there be a system failure such as a failure of a power drive unit for one of the shafts, or a failure of the shaft itself, a large torque spike can be imparted to the system because of the large relative speed between the shafts and the rapid deceleration that will occur when system stops are encountered. As a result, such torque spikes make it necessary for components to be upsized in many systems.

For instance, on many aircraft actuation systems, a primary drive shaft is used to connect the power drive unit to the flap actuators. A secondary drive shaft is normally connected to the power drive unit through a lost motion device that enables detection of a broken primary drive shaft, but prevents torque from being carried by the secondary drive shaft under normal operating conditions. With such systems, a significant problem occurs when a primary drive shaft fails under aiding air loads.

In particular, aiding air loads cause the flap and actuators to rapidly accelerate until the extreme of lost motion is reached. When this occurs and stops are encountered, the rapid deceleration caused thereby will impart a large torque spike to the system. In order to avoid the necessity of upsizing the components of the flap system, it is necessary to minimize the torque spike by limiting the relative speed between the secondary drive shaft and the power drive unit.

In a specific system for aircraft, the flaps are normally driven by two power drive units which each include an electric motor connected by means of a flexible shaft to one side of a torque sensor. If an electric motor should fail, the torque sensor will connect the flexible shafts to allow the remaining operable motor to drive the entire system and will send a signal to the main controller signaling a malfunction. Unfortunately, it is generally recognized that several significant problems can arise in from such systems.

Specifically, lost motion is required in the torque sensor to allow the flex shafts to remain unloaded. Because of the lost motion, the two sides of the system, i.e., the primary and secondary load paths, obtain a large relative speed in the event of a motor failure under load. As a result, system components can be severely damaged when the available lost motion is used up, e.g., stop and flex shaft failures can be experienced from inertial loads, due to the large relative speed.

Among the attempts to provide shaft relative speed limiting devices is that disclosed in Clark U.S. Pat. No. 4,493,479. The device disclosed therein is a safety system in which a brake-actuating mechanism is operated in response to a mechanical detector receiving inputs directly from a motor shaft and a drum shaft where the mechanical detector has an output shaft which signals to actuate the brake actuating mechanism when there is a variation in the relative angular volocities between the two shafts to thereby set the brake. For this purpose, Clark utilizes shaft rotation to provide the force for applying the brake or, alternatively, the brake is set by a large force spring controlled by a trigger mechanism.

Among other attempts to provide shaft controlling devices for various applications are those disclosed in Ford U.S. Pat. No. 4,219,107 and Abramham U.S. Pat. No. 2,950,086.

In practice, it has remained to provide a satisfactory shaft relative speed limiting system useful for a variety of systems. More particularly, it has remained to provide a system of the type described for use on aircraft flap actuation systems where a primary drive shaft is used to connect a power drive unit to flap actuators together with a secondary drive shaft. Moreover, it has remained to provide such a system for use on aircraft flap actuation systems utilizing two power drive units each including an electric motor connected by means of a flexible shaft to one side of a torque sensor to normally drive the flaps.

The present invention is directed to overcoming the above stated problems and accomplishing the stated objects.

SUMMARY OF THE INVENTION

Accordingly, the present invention is directed to a shaft relative speed limiting system having a pair of shafts normally driven at selected speeds. It includes lost motion means operatively associated with the shafts such that one of the shafts drives the other of the shafts in the event of a system failure. The shaft relative speed limiting system also includes means for limiting the relative speed between the shafts. It comprises a first portion normally driven by one of the shafts at the selected speed thereof and a second portion normally driven by the other of the shafts at the selected speed thereof. In addition, the shaft relative speed limiting system includes brake means operatively associated with the shafts through the first and second portions to limit the relative speed between the shafts in the event of a system failure In one embodiment, one of the pair of shafts is a primary drive shaft and the other of the pair of shafts is a secondary drive shaft. The primary and secondary drive shafts are operatively associated with a shaft driven component such as an aircraft flap. Also, the primary drive shaft normally is driven by a power drive unit and the secondary drive shaft normally is driven through the shaft driven component.

With this arrangement, the primary and secondary drive shafts are normally driven at the same speed. However, the lost motion means will cause the secondary drive shaft to drive the shaft driven component, e.g., aircraft flap, when the system failure is a failure of the primary drive shaft between the power drive unit and the shaft driven component. For this purpose, the lost motion means will include a first portion operatively associated with the primary drive shaft and a second portion operatively associated with the secondary drive shaft. While the first and second portions of the lost motion means are normally maintained in spaced relation, they are adapted for relative movement toward one another in the event of a failure of the primary drive shaft.

In addition, the lost motion means includes spaced apart interengagement means on the first and second portions thereof. It will be appreciated that the first and second portions of the lost motion means are then driven toward one another by the secondary drive shaft in the event of a failure of the primary drive shaft to cause the interengagement means to be moved into driving engagement. As a result of driving engagement of the interengagement means, the secondary drive shaft thereafter drives the shaft driven component through the first and second portions of the lost motion means.

In another embodiment, one of the pair of shafts is a first shaft operatively associated with the shaft driven component and the other of the shafts is a second shaft operatively associated with the shaft driven component. The first and second shafts are each normally driven by a separate power drive unit at the same speed and are operatively associated with one another through a torque sensor comprising the lost motion means and the relative speed limiting means. Additionally, the torque sensor includes a third shaft operatively associated with the first and second drive shafts where the third shaft is stationary when the first and second shafts are driven at the same speed and rotates only when there is a failure of one of the power drive units.

With this construction, the lost motion means limits the amount of rotation of one of the first and second shafts relative to the other of the shafts. It also thereafter permits the other of the power drive units to drive both the first shaft and the second shaft to thereby drive one or more shaft driven components. As will be appreciated, the lost motion means is operative when the system failure is a failure of one of the power drive units, and one of the first and second shafts drives the other of the shafts through the third shaft.

In either embodiment, the first portion of the relative speed limiting means comprises first gear means normally driven by the first or primary shaft and the second portion of the relative speed limiting means comprises second gear means normally driven by the second or secondary shaft. The first and second gear means are operatively associated with a third shaft in each instance such that the third shaft is stationary when the first or primary and second or secondary shafts are driven at the same speed and rotates when the system failure is a failure of a power drive unit or a primary shaft, respectively. When this occurs, the first or primary shaft and the second or secondary shaft are driven at different speeds until the lost motion means causes the shaft remaining in operation to drive the shaft driven component.

Other objects, advantages and features of the present invention will become apparent from the following specification taken in conjunction with the accompanying drawings.

DESCRIPTION OF THE PREFERRED EMBODIMENTS

Figure 1:
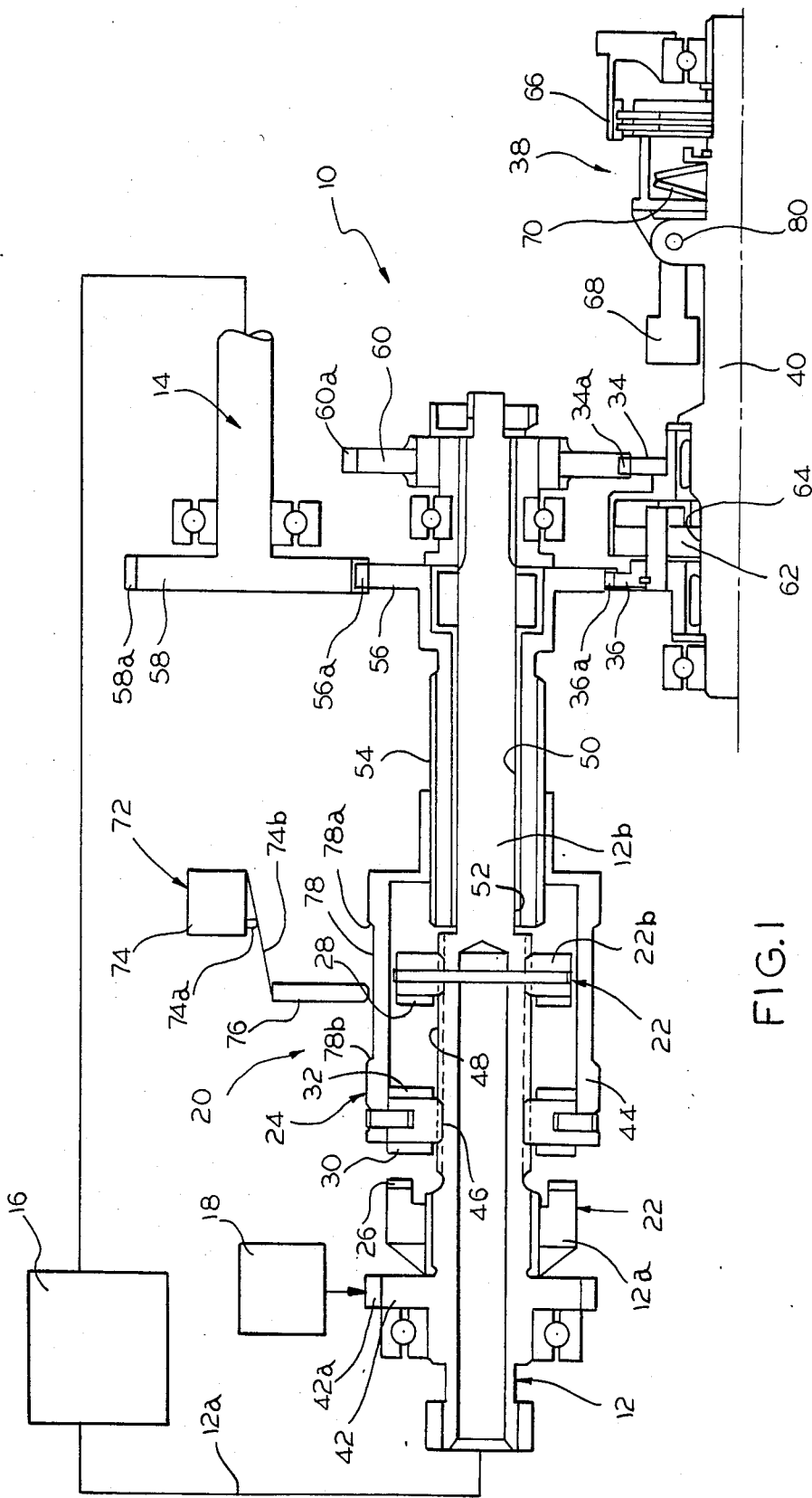
FIG. 1 is a cross sectional view of a first embodiment of shaft relative speed limiting system in accordance with the invention.

An exemplary embodiment of a shaft relative speed limiting system in accordance with the invention is illustrated in FIG. 1. The system 10 includes a primary drive shaft 12 and a secondary drive shaft 14 normally driven at the same speed. The primary and secondary drive shafts 12 and 14 are operatively associated with a shaft driven component 16 such as an aircraft flap, and the primary drive shaft 12 is normally driven by a power drive unit 18 with the secondary drive shaft 14 normally being driven through the shaft driven component 16. The system 10 also includes lost motion means 20 operatively associated with the primary and secondary drive shafts 12 and 14. As shown, the lost motion means 20 includes a first portion 22 operatively associated with the primary drive shaft 12 and a second portion 24 normally axially spaced from the first portion 22 and operatively associated with the secondary drive shaft 14.

More specifically, the first and second portions 22 and 24 of the lost motion means 20 normally are maintained in spaced relation, as shown, but are adapted for relative movement toward one another in the event of a failure in the primary drive shaft 12 between the power drive unit 18 and the shaft driven component 16. The lost motion means 20 includes interengagement means such as the jaws 26 and 28 on the first portion 22 thereof and interengagement means such as the jaws 30 and 32 on the second portion 24 thereof. Under normal operating conditions, the jaws 30 and 32 are spaced from the jaws 26 and 28, and the second portion 24 of the lost motion means 20 is only driven toward the first portion 22 by the secondary drive shaft 14 in the event of a failure in the primary drive shaft 12.

Still referring to FIG. 1, the secondary drive shaft 14 drives the second portion 24 of the lost motion device 20 to cause the interengagement means or jaws 26, 30 or 28, 32 to be moved into driving engagement depending upon the direction of rotation thereof. As a result, the driving engagement of the interengagement means or jaws 26, 30 or 28, 32 causes the secondary drive shaft 14 to thereafter drive the shaft driven component 16 through the first and second portions 22 and 24 of the lost motion means 20. With this arrangement, the secondary drive shaft 14 is driven by the power drive unit 18 through the lost motion means 20, i.e., through the engaged jaws 26, 30 or 28, 32 of the first and second portions 22 and 24 thereof, in the event of a failure in the primary drive shaft 12.

In the embodiment illustrated in FIG. 1, the system 10 further includes means for limiting the relative speed between the primary and secondary drive shafts 12 and 14. The relative speed limiting means operates in the event of a failure in the primary drive shaft 12 and includes first gear means 34 normally driven by the primary drive shaft 12 and second gear means 36 normally driven by the secondary drive shaft 14. Moreover, the relative speed limiting means includes brake means 38 disposed on a third shaft 40 extending in generally parallel relation to both the primary and secondary drive shafts 12 and 14.

As will be described in detail hereinafter, the first and second gear means 34 and 36 are operatively associated with the third shaft 40 such that the third shaft 40 is stationary when the primary and secondary drive shafts 12 and 14 are driven at the same speed. Specifically, the relationship between the first and second gear means 34 and 36 and the third shaft 40 is such that the third shaft 40 rotates in the FIG. 1 embodiment only when the primary and secondary drive shafts 12 and 14 are driven at different speeds, e.g., when the primary drive shaft 12 has failed. When this occurs, the primary and secondary drive shafts 12 and 14 will continue to be driven at different speeds until the lost motion means 20 causes the secondary drive shaft 14 to drive the shaft driven component 16.

When the primary and secondary drive shafts 12 and 14 are driven at different speeds, the brake means 38 serves to limit relative speed therebetween. To achieve this objective, the brake means 38 is operatively associated with the secondary drive shaft 14 through the first and second gear means 34 and 36. Moreover, the brake means 38 is operative to limit the relative speed between the primary and secondary drive shafts 12 and 14 to a preselected amount.

As shown in FIG. 1, the primary drive shaft 12, the secondary drive shaft 14 and the third shaft 40 are all disposed in generally parallel relation. It will also be seen that the primary drive shaft 12 includes input gear means 42 operatively associated with the power drive unit 18 and includes a principal drive shaft portion 12a extending from the input gear means 42 to the shaft driven component 16. In addition, the primary drive shaft 12 includes a supplemental drive shaft portion 12b extending from the input gear means 42 toward the secondary drive shaft 14 and third shaft 40, substantially as shown.

Referring to the lost motion means 20, the first portion 22 thereof is integral with the supplemental drive shaft portion 12b of the primary drive shaft 12 and the second portion 24 thereof includes a sleeve 44 having threads as at 46 cooperating with mating threads as at 48 on the supplemental drive shaft portion 12b. The mating threads 46 and 48 accommodate movement of the second portion 24 of the lost motion means 20 toward and away from the first portion thereof, i.e., toward and away from either the end 22a thereof bearing jaw 26 or the end 22b thereof bearing jaw 28, and the sleeve 44 has splines as at 50 remote from the first portion 22 of the lost motion means 20 cooperating with mating splines as at 52 on a tubular extension 54 disposed in generally coaxial relation to the supplemental drive shaft portion 12b. With this arrangement, the tubular extension 54 has gear means 56 disposed on the end thereof remote from the lost motion means 20 in gear driving relation to gear means 58 on the secondary drive shaft 14 and in gear driving relation to the first gear means 36 of the relative speed limiting means.

As also shown in FIG. 1, the supplemental drive shaft portion 12b of the primary drive shaft 12 includes gear means 60 in gear driving relation to the first gear means 34 of the relative speed limiting means. The first gear means 34 comprises a ring gear assembly and the second gear means 36 comprises a planetary carrier for a plurality of planetary gears such as 62 with the ring gear assembly 34 being in gear driving relation to the planetary gears such as 62 carried by the planetary carrier 36. Additionally, as shown, the third shaft 40 includes a sun gear 64 in gear driving relation to the planetary gears such as 62, and the gear means 60 on the supplemental drive portion 12b of the primary drive shaft 12 drives the ring gear assembly 34, the gear means 56 on the tubular extension 54 driving the planetary carrier 36.

With regard to the brake means 38, it preferably includes a disc brake 66 applied by a plurality of pivotally mounted flyweights 68. The flyweights 68 are disposed circumferentially about the third shaft 40 and normally extend in generally parallel relation to the third shaft 40, as shown, and include spring means such as the Bellville spring 70 applying a biasing force tending to maintain the flyweights 68 in generally parallel relation to the third shaft 40. As will be appreciated, the flyweights 68 pivot outwardly in response to rotation of the third shaft 40 against the biasing force of the Bellville spring 70 to apply the disc brake 66.

With this construction, the disc brake 66 limits the speed of rotation of the third shaft 40 which thereby limits the relative speed between the primary and secondary drive shafts 12 and 14 through the first and second gear means 34 and 36. In particular, this occurs because of the fact that the supplemental drive shaft portion 12b of the primary drive shaft 12 is operatively associated with the secondary drive shaft 14 through the respective sets of gear means 34, 60 and 36, 56, 58 by means of the third shaft 40. In addition, the system 10 includes indicator means 72 associated with the lost motion means 20 for giving a perceptible indication of a failure in the primary drive shaft 12 between the power drive unit 18 and the shaft driven component 16.

With regard to the indicator means 72, it will be appreciated that it can take the form of any of a variety of devices that are capable of giving a perceptible indication. The specific indicator means illustrated employs a microswitch 74 having a depressible switch button 74a and a pivotable switch arm 74b movable in response to movement of a finger 76 extending toward the second portion 24 of the lost motion means 20. As will be appreciated, the finger 76 causes the switch arm 74b to depress the switch button 74a when either end 78a or 78b of an undercut 78 in the outer surface of the second portion 24 of the lost motion means 20 biases the finger 76 radially outwardly.

As will also be appreciated, the various gear means 34, 36, 42, 56, 58 and 60 have gear teeth 34a, 36a, 42a, 56a, 58a and 60a to achieve the gear driving relationships described hereinabove. Specifically, the respective gear teeth 34a and 60a are in intermeshing gear driving relation, the gear teeth 36a and 56a are in intermeshing gear driving relation, the gear teeth 56a and 58a are in intermeshing gear driving relation, and the gear teeth 42a are in intermeshing gear driving relation with corresponding gear teeth associated with the power drive unit 18. Moreover, the ring gear asssembly 34 includes gear teeth in intermeshing gear driving relation with corresponding gear teeth of the planetary gears such as 62 which are in intermeshing gear driving relation with corresponding gear teeth on the sun gear 64.

In operation of the embodiment of FIG. 1, the power drive unit 18 drives the first portion 22 of the lost motion means 20, the first gear means or ring gear assembly 34 of the relative speed limiting means, and the primary drive shaft portion 12a extending to the shaft driven component or aircraft flap 16. The secondary drive shaft 14 is operatively associated with the primary drive shaft portion 12a through the shaft driven component or aircraft flap 16 which causes the secondary drive shaft 14 to normally rotate at the same speed as the primary drive shaft 12. Also, the secondary drive shaft 14 drives the second portion 24 of the lost motion means 20 and the second gear means or planetary carrier 36 of the relative speed limiting means.

By selecting gear ratios for the gear means 56 and 60 that drive the planetary carrier 36 and the ring gear assembly 34, and when the gear means 56 and 60 rotate at the same speed, i.e., when the primary and secondary drive shafts 12 and 14 rotate at the same speed, the third shaft 40 together with the sun gear 64 will be stationary.

If the primary drive shaft 12 should fail or break between the primary drive unit 18 and the shaft driven component or aircraft flap 16, the gear means 56 and 60 will be caused to rotate at different speeds due to the air loads on the aircraft flap 16. More specifically, the secondary shaft 14 will be caused to rotate at a much higher relative speed than the supplemental drive shaft portion 12b which will cause the gear means 58 to drive the gear means 36 through the gear means 56 at a higher speed than the supplemental drive shaft portion 12b is driving the gear means 34 through gear means 60. When this occurs, the third shaft 40 will begin to rotate at a speed that is dependent upon the various gear ratios, as will be appreciated by those skilled in the art, and when the third shaft 40 rotates, the flyweights 68 will pivot outwardly about the pivot point 80 to apply the disc brake 66 to limit the speed of the third shaft 40.

By limiting the speed of the third shaft 40, the relative speed of the gear means 56 and 60 and, thus, the relative speed of the power drive unit 18 and the supplemental drive shaft portion 12b on the one hand, and the secondary drive shaft 14, on the other hand, will be limited. However, the Bellville spring 70 does allow a predetermined relative speed to occur before the flyweights 68 begin applying the disc brake 66 and limiting the relative speed. As will be appreciated, this ensures that the lost motion means 20 will translate to its stops even with very small air loads, i.e., either the jaws 26 and 30 or the jaws 28 and 32 will engage, in the event of a failure of the primary drive shaft 12 between the power drive unit 18 and the shaft driven component or aircraft flap 16.

When there is a failure in the primary drive shaft 12, the lost motion means 20 is driven through the secondary drive shaft 14, i.e., the gear means 58 drives the gear means 56 which, in turn, drives the second portion 24 of the lost motion means 20 relative to the first portion 22 thereof. This occurs because of the mating splines 50 and 52 on the second portion 24 of the lost motion means 20 and the tubular extension 54. Since the second portion 24 of the lost motion means 20 is mounted on the primary drive shaft 12 by means of mating threads 46 and 48, the relative speed difference will cause the second portion 24 to move either toward the end 22a or the end 22b of the first portion 22 of the lost motion means 20 depending upon the direction of rotation.

Figure 2:
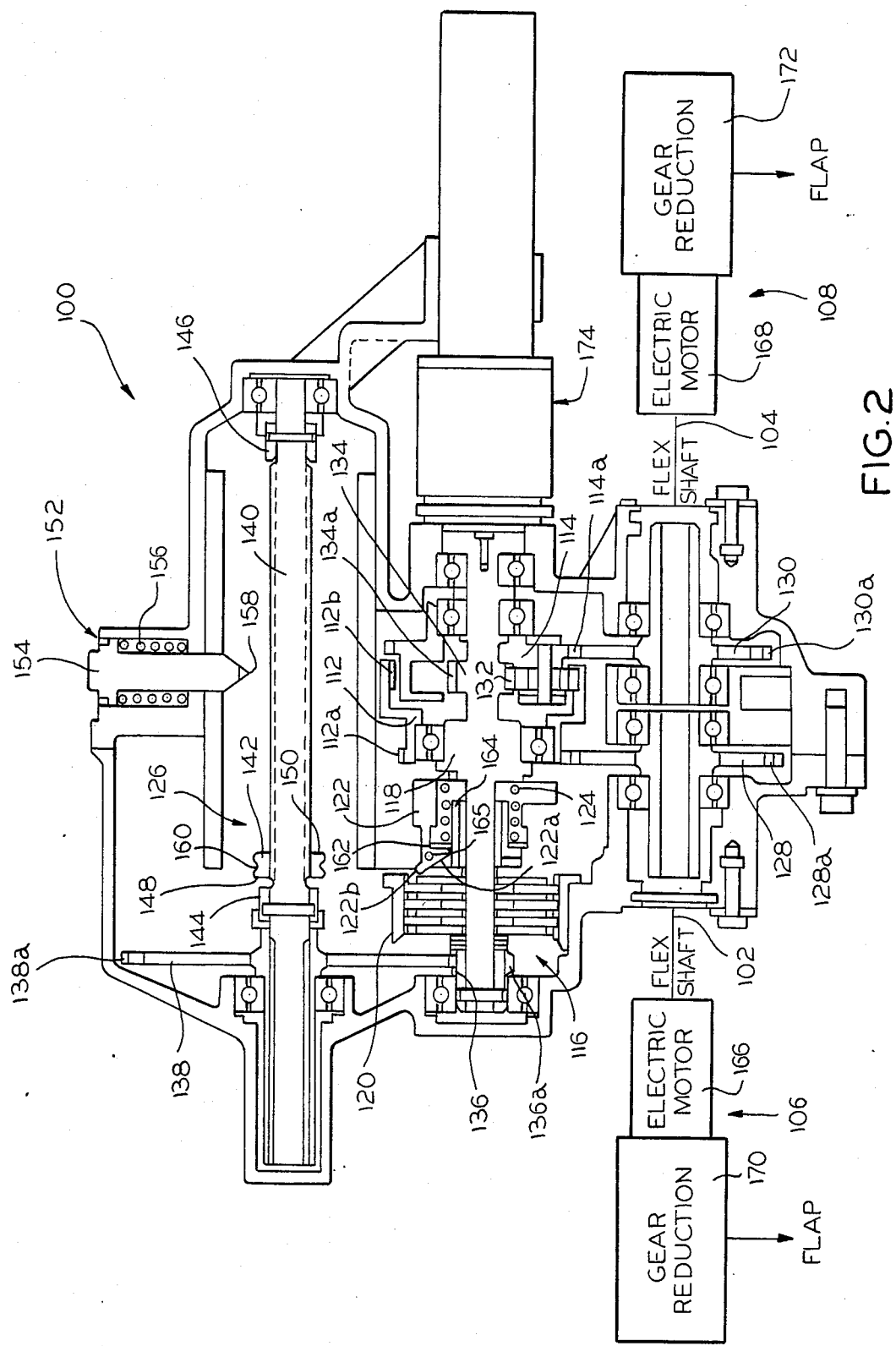
FIG. 2 is a cross sectional view of a second embodiment of shaft relative speed limiting system in accordance with the invention.

Referring to FIG. 2, a shaft relative speed limiting system 100 in accordance with a second embodiment of the present invention is illustrated. The system 100 includes a first shaft 102 and a second shaft 104 normally driven at the same speed where the first and second shafts 102 and 104 are each operatively associated with a shaft driven component such as an aircraft flap and each is normally driven by a separate power drive unit 106 and 108, respectively. Moreover, as shown, the first shaft 102 is operatively associated with the second shaft 104 through a torque sensor 110.

Still referring to FIG. 2, the torque sensor 110 includes means for limiting the relative speed between the first and second shafts 102 and 104 in the event of failure of one of the power drive units 106 or 108. More specifically, the relative speed limiting means includes first gear means 112 normally driven by one of the shafts 102, second gear means 114 normally driven by the other of the shafts 104, and brake means 116 disposed on a third shaft 118.

With this arrangement, the first and second gear means 112 and 114 are operatively associated with the third shaft 118 such that the third shaft 118 is stationary when the first and second shafts 102 and 104 are driven at the same speed. However, the first and second shafts 102 and 104 will be driven at different speeds in the event of a failure of one of the power drive units 106 or 108. If this should occur, the first and second gear means 112 and 114 are operatively associated with the third shaft 118 such that the third shaft 118 rotates when the first and second drive shafts 102 and 104 will then be driven at different speeds.

Referring to the brake means 116, it will be seen that it is operatively associated with the first and second shafts 102 and 104 through the first and second gear means 112 and 114. The brake means 116 is operative to limit the relative speed between the first and second shafts 102 and 104 to a preselected amount. Generally, the brake means 116 is operative in the same fashion as the brake means 38 of the first embodiment.

More specifically, the brake means 116 includes a disc brake 120 applied by a plurality of pivotally mounted flyweights 122 normally extending in generally parallel relation to the third shaft 118. It will also be seen that the brake means 116 includes spring means such as the coil spring 124 applying a biasing force tending to maintain the flyweights 122 in generally parallel relation to the third shaft 118 such that the flyweights 122 pivot outwardly in response to rotation of the third shaft 118 against the biasing force of the coil spring 124 to apply the disc brake 120. With this construction, the disc brake 120 can limit the speed of rotation of the third shaft 118 thereby limiting the relative speed between the first and second shafts 102 and 104 through the first and second gear means 112 and 114.

The torque sensor 110 also includes lost motion means 126 driven by the third shaft 118 in a manner limiting the amount of rotation of one of the shafts 102, 104 relative to the other of the shafts 102, 104. The lost motion means 126 is operative in the event of failure of one of the power drive units 106 or 108. In addition, the lost motion means 126 thereafter permits the other of the power drive units 106 or 108 to drive both of the shafts 102, 104 through the torque sensor 110.

As shown in FIG. 2, the first shaft 102, the second shaft 104 and the third shaft 118 are all disposed in generally parallel relation. The first shaft 102 includes gear means 128 in gear driving relation to the first gear means 112 of the relative speed limiting means and the second shaft 104 includes gear means 130 in gear driving relation to the second gear means 114 of the relative speed limiting means, with the first gear means 112 comprising a ring gear assembly and the second gear means 114 comprising a planetary carrier for a plurality of planetary gears such as 132. In the illustrated embodiment, the ring gear assembly 112 is in gear driving relation with the planetary gears such as 132 carried by the planetary carrier 114.

Additional details of the embodiment illustrated in FIG. 2 include a sun gear 134 within the torque sensor 110. Specifically, the sun gear 134 is provided on the third shaft 118 in gear driving relation to the planetary gears such as 132. With this arrangement, the gear means 128 on the first shaft 102 drives the ring gear assembly 112 and the gear means 130 on the second shaft 104 drives the planetary carrier 114.

In the FIG. 2 embodiment, the third shaft 118 includes an outer gear 136 in gear driving relation to an input gear 138 of the lost motion means 126. The input gear 138 is integral with a threaded shaft 140 carrying a traveling nut 142 and having interengagement means such as jaws 144 and 146 at opposite ends thereof adapted to cooperate with corresponding interengagement means or jaws 148 and 150 on opposite ends of the traveling nut 142. With this construction, the traveling nut 142 is driven toward one end or the other of the threaded shaft 140 depending upon the direction of rotation of the third shaft 118.

Additionally, the lost motion means 126 includes means for centering the traveling nut 142 on the threaded shaft 140 such as a spring biased button assembly 152 disposed midway between the opposite ends of the threaded shaft 140. More specifically, button assembly 152 includes a button 154 normally biased away from the threaded shaft 140 by means of a coil spring 156, but having a point 158 adapted to be disposed in a circumferential groove 160 in the traveling nut 142 when the button 154 is depressed to assure centering.

With the arrangement illustrated in FIG. 2, the interengagement means or jaws 144, 148 and 146, 150 cause the threaded shaft 140 to stop rotating when the traveling nut 142 reaches either end of the threaded shaft 140 during rotation of the third shaft 118. As will therefore be appreciated, the lost motion means 126 thereby limits the amount of rotation of one of the shafts 102, 104 relative to the other of the shafts 102, 104 in the event of failure of one of the power drive units 106 or 108.

As will also be appreciated, the jaws 144, 148 and 146, 150 cause the third shaft 118 to stop rotating through the input gear 138 of the threaded shaft 140 and the output gear 136 of the third shaft 118. Thereafter, the other of the power drive units 106 or 108 will thereafter drive both of the shafts 102, 104 through the gear means 128, 130 disposed in gear driving relation with the ring gear assembly 112 and the planetary carrier 114.

As shown in FIG. 2, the brake means 116 is slightly different in construction from the brake means 38 in FIG. 1. In particular, the flyweights 122 include inwardly projecting fingers 122a disposed to act against a radially extending flange 162 integral with a sleeve 164 disposed in coaxial relation to the third shaft 118 where the coil spring 124 also acts against the radial flange 162 but in the opposite direction. In addition, the flyweights 122 include a portion 122b extending opposite the finger 122a in relation to the pivotal mounting 165 to act against the disc brake 120 when the flyweights 122 pivot outwardly.

As with the FIG. 1 embodiment, the various gear means 112, 114, 128, 130, 136 and 138 each includes corresponding gear teeth 112a, 114a, 128a, 130a, 136a and 138a with the respective pairs of teeth 112a and 128a, 114a and 130a, and 136a and 138a in intermeshing gear driving relationship. In addition, the ring gear assembly 112, the planetary carrier 114, the planetary gears such as 132, and the sun gear 134 have respective intermeshing gear teeth in conventional fashion, and as described in connection with the embodiment illustrated in FIG. 1.

Also as shown in FIG. 2, the power drive units 106 and 108 include respective electric motors 166 and 168 and respective gear reduction units 170 and 172 leading to flaps. However, the exact details of the power drive units 106 and 108 can be regarded as conventional and, moreover, the details of the embodiment illustrated in FIG. 2 are equally applicable to any of a variety of power drive units.

With the embodiment illustrated in FIG. 2, the first and second shafts 102 and 104 are preferably flex shafts driving opposite sides of the planetary differential comprising the first and second gear means 112 and 114. By selecting the proper gear ratios, the sun gear 134 can be made to rotate at a speed proportional to the difference in speeds of the two flex shafts 102 and 104. As will also be appreciated, the sun output position is proportional to the difference in position of the flex shaft inputs.

As previously mentioned, a disc brake 120 actuated by a flyweight 122 is attached to the third shaft 118 carrying the sun gear 134 and increases torque with increasing speed thereby limiting the speed of the third shaft 118. By limiting the speed of the third shaft 118, the relative speed of the flex shafts 102 and 104 is also limited. In this connection, the coil spring 124 holds the flyweights 122 in a position generally parallel to the third shaft 118 below a predetemined speed, thereby allowing no torque to be passed through the flex shafts 102 or 104 below a certain relative speed.

Also, as previously mentioned, the outer gear 136 is attached to the third shaft 118 carrying the sun gear 134 to drive the lost motion means or traveling nut stop 126 through the input gear 138 to limit the relative position of the flex shafts 102 and 104 thereby limiting the asymmetry between flaps driven thereby. By preventing rotation of the sun gear 134 through the traveling nut stop 126 in the manner described hereinabove, a one-to-one ratio will thereafter exist between the flex shafts 102 and 104 with inertia energy being absorbed by the spring rate of the webs of the input gear 138 and the torsion section of the threaded shaft 140.

Also attached to the third shaft 118 is a rotary position tranducer 174. This allows the system controller to monitor and control the relative position of the flex shafts 102 and 104. In addition, it allows the system controller to sense when a stop is engaged and the torque sensor is passing torque.

While in the foregoing there has been set forth preferred embodiments of the invention, it is to be understood that the invention is only to be limited by the spirit and scope of the appended claims.

We claim:

1. A shaft relative speed limiting system, comprising:
a pair of shafts normally driven at selected speeds;
lost motion means operatively associated with said shafts such that one of said shafts drives the other of said shafts in the event of a system failure; and
means for limiting the relative speed between said shafts in the event of a system failure, said relative speed limiting means including a first portion normally driven by one of said shafts at said selected speed thereof, said relative speed limiting means also including a second portion normally driven by the other of said shafts at said selected speed thereof, said relative speed limiting means including brake means operatively associated with said shafts through said first and second portions of said relative speed limiting means.
said brake means limiting the relative speed between said shafts in the event of a system failure.

2. The shaft relative speed limiting system as defined by claim 1 wherein one of said pair of shafts is a primary drive shaft and the other of said pair of shafts is a secondary drive shaft, said primary and secondary drive shafts being operatively associated with a shaft driven component, said primary drive shaft normally being driven by a power drive unit and said secondary drive shaft normally being driven through said shaft driven component.

3. The shaft relative speed limiting system as defined by claim 2 wherein said primary and secondary drive shafts are normally driven at the same speed, said lost motion means causing said secondary drive shaft to drive said shaft driven component when said system failure is a failure of said primary drive shaft between said power drive unit and said shaft driven component, said secondary drive shaft also driving the portion of said primary drive shaft remote from said power drive unit through said shaft driven component.

4. The shaft relative speed limiting system as defined by claim 3 wherein said lost motion means includes a first portion operatively associated with said primary drive shaft and a second portion operatively associated with said secondary drive shaft, said first and second portions normally being maintained in spaced relation, said first and second portions being adapted for relative movement toward one another when said system failure is a failure of said primary drive shaft between said power drive unit and said shaft driven component.

5. The shaft relative speed limiting system as defined by claim 4 wherein said lost motion means includes interengagement means on said first portion thereof and interengagement means on said second portion thereof normally spaced from said interengagement means on said first portion thereof, said first and second portions of said lost motion means being driven toward one another by said secondary drive shaft when said system failure is a failure of said primary drive shaft between said power drive unit and said shaft driven component.

6. The shaft relative speed limiting system as defined by claim 5 wherein said secondary drive shaft drives said first and second portions of said lost motion device to cause said interengagement means to be moved into driving engagement, said driving engagement of said interengagement means causing said secondary drive shaft to thereafter drive said shaft driven component through said first and second portions of said lost motion means, said secondary drive shaft being driven by said power drive unit when said system failure is a failure of said primary drive shaft between said power drive unit and said shaft driven component.

7. The shaft relative speed limiting system as defined by claim 1 wherein one of said pair of shafts is a first drive shaft operatively associated with a shaft driven component and the other of said shafts is a second drive shaft operatively associated with a shaft driven component, each of said first and second drive shafts normally being driven by a separate power drive unit at the same speed and being operatively associated with one another to a torque sensor comprising said lost motion means and said relative speed limiting means.

8. The shaft relative speed limiting system as defined by claim 7 wherein said torque sensor includes a third shaft operatively associated with said first and second drive shafts, said third shaft being stationary when said first and second drive shafts are driven at the same speed and rotating only when said system failure is a failure of one of said power drive units, said lost motion means being operatively associated with said third shaft such that said lost motion means is driven by rotation thereof.

9. The shaft relative speed limiting system as defined by claim 8 wherein said lost motion means limits the amount of rotation of one of said drive shafts relative to the other of said drive shafts when said system failure is a failure of one of said power drive units, said lost motion means thereafter permitting the other of said power drive units to drive both said first drive shaft and said second drive shaft to thereby drive both said first shaft driven component and said second shaft driven component.

10. The shaft relative speed limiting system as defined by claim 2 wherein said first portion of said relative speed limiting means comprises first gear means normally driven by said primary drive shaft and said second portion of said relative speed limiting means comprises second gear means normally driven by said secondary drive shaft, said first and second gear means being operatively associated with a third shaft such that said third shaft is stationary when said primary and secondary shafts are driven at the same speed and rotates when said system failure is a failure of said primary drive shaft between said power drive unit and said shaft driven component.

11. The shaft relative speed limiting system as defined by claim 10 wherein said primary and secondary drive shafts are driven at different speeds when said system failure is a failure of said primary drive shaft between said power drive unit and said shaft driven component until said lost motion means causes said secondary drive shaft to drive said shaft driven component and a portion of said primary drive shaft remote from said power drive unit.

12. The shaft relative speed limiting system as defined by claim 10 wherein said relative speed limiting means includes brake means disposed on said third shaft and operatively associated with said secondary drive shaft through said first and second gear means to limit the relative speeds between said primary and secondary drive shafts to a preselected amount.

13. The shaft relative speed limiting system as defined by claim 7 wherein said relative speed limiting means is operative between said first and second drive shafts when said system failure is a failure of one of said power drive units, said relative speed limiting means including first gear means normally driven by one of said drive shafts and second gear means normally driven by the other of said drive shafts.

14. The shaft relative speed limiting system as defined by claim 13 wherein said first and second gear means are operatively associated with a third shaft such that said third shaft is stationary when said first and second drive shafts are driven at the same speed, said first and second gear means being operatively associated with said third shaft such that said third shaft rotates when said first and second drive shafts are driven at different speeds.

15. The shaft relative speed limiting system as defined by claim 14 wherein said first and second drive shafts are driven at different speeds when said system failure is a failure of one of said power drive units, said relative speed limiting means including brake means disposed on said third shaft, said brake means being operatively associated with said first and second drive shafts to limit the relative speeds between said first and second drive shafts to a preselected amount.

16. A shaft relative speed limiting system, comprising:
a primary drive shaft and a secondary drive shaft normally driven at the same speed, said primary and secondary drive shafts being operatively associated with a shaft driven component, said primary drive shafts normally being driven by a power drive unit and said secondary drive shaft normally being driven through said shaft driven component;
lost motion means operatively associated with said primary and secondary drive shafts, said lost motion means including a first portion operatively associated with said primary drive shaft and a second portion normally spaced from said first portion and operatively associated with said secondary drive shaft, said first and second portions of said lost motion means normally being maintained in spaced relation but being adapted for relative movement toward one another in the event of a primary drive shaft failure between said power drive unit and said shaft driven component, said lost motion means including interengagement means on said first portion thereof and interengagement means on said second portion thereof normally spaced from said interengagement means on said first portion thereof, said lost motion means being driven by said secondary drive shaft in the event of a primary drive shaft failure;

said secondary drive shaft driving one of said first and second portions of said lost motion means to cause said interengagement means to be moved into driving engagement, said driving engagement of said interengagement means causing said secondary drive shaft to thereafter drive said shaft driven component through said first and second portions of said lost motion means, said secondary drive shaft being driven by said power drive unit in the event of a primary drive shaft failure; and means for limiting the relative speed between said primary and secondary drive shafts in the event of a primary drive shaft failure, said relative speed limiting means including first gear means normally driven by said primary drive shaft and second gear means normally driven by said secondary drive shaft, said relative speed limiting means including brake means disposed on a third shaft;

said first and second gear means being operatively associated with said third shaft such that said third shaft is stationary when said primary and secondary drive shafts are driven at the same speed, said first and second gear means being operatively associated with said third shaft such that said third shaft rotates when said primary and secondary drive shafts are driven at different speeds;

said primary and secondary drive shafts being driven at different speeds in the event of a primary drive shaft failure until said lost motion means causes said secondary drive shaft to drive said shaft driven component;

said brake means being operatively associated with said secondary drive shaft through said first and second gear means and being operative to limit the relative speed between said primary and secondary drive shafts to a preselected amount.

17. The shaft relative speed limiting device as defined by claim 16 wherein said primary drive shaft, said secondary drive shaft and said third shaft are disposed in generally parallel relation, said primary drive shaft including input gear means operatively associated with said power drive unit, said primary drive shaft including a principal drive portion extending from said input gear means to said shaft driven component, said primary drive shaft including a supplemental drive shaft portion extending from said input gear means away from said principal drive portion.

18. The shaft relative speed limiting device as defined by claim 17 wherein said first portion of said lost motion means is integral with said supplemental drive shaft portion of said primary drive shaft and said second portion of said lost motion means includes a sleeve having threads cooperating with mating threads on said supplemental drive shaft portion of said primary drive shaft, said mating threads accommodating movement of said second portion of said lost motion means toward and away from said first portion thereof and said sleeve having splines remote from said first portion cooperating with mating splines on a tubular extension disposed in generally coaxial relation to said supplemental drive shaft portion of said primary drive shaft, said tubular extension having gear means disposed on the end thereof remote from said lost motion means in gear driving relation to gear means on said secondary drive shaft and said first gear means of said relative speed limiting means.

19. The shaft relative speed limiting device as defined by claim 18 wherein said supplemental drive shaft portion of said primary drive shaft includes gear means in gear driving relation to said first gear means of said relative speed limiting means, said first gear means comprising a ring gear assembly and said second gear means comprising a planetary carrier for a plurality of planetary gears, said ring gear assembly being in gear driving relation to said planetary gears carried by said planetary carrier and including a sun gear on said third shaft in gear driving relation to said planetary gears, said gear means on said supplemental drive portion of said primary drive shaft driving said ring gear assembly and said gear means on said tubular extension driving said planetary carrier.

20. The shaft relative speed limiting device as defined by claim 16 wherein said brake means includes a disc brake applied by a plurality of pivotally mounted flyweights, said flyweights normally extending in generally parallel relation to said third shaft and including spring means applying a biasing force tending to maintain said flyweights in generally parallel relation to said third shaft, said flyweights pivoting outwardly in response to rotation of said third shaft against the biasing force of said spring means to apply said disc brake.

21. The shaft relative speed limiting device as defined by claim 20 wherein said disc brake limits the speed of rotation of said third shaft, said third shaft thereby limiting the relative speed between said primary and secondary drive shafts through said first and second gear means.

22. The shaft relative speed limiting device as defined by claim 16 including indicator means associated with said lost motion means for giving a perceptible indication of a primary drive shaft failure between said power drive unit and said shaft driven component.

23. A shaft relative speed limiting system, comprising:

a first shaft and a second shaft normally driven at the same speed, said first and second shafts each being operatively associated with a shaft driven component and each normally being driven by a separate power drive unit, said first shaft being operatively associated with said second shaft through a torque sensor;

said torque sensor including means for limiting the relative speed between said first and second shafts in the event of failure of one of said power drive units, said relative speed limiting means including first gear means normally driven by one of said shafts and second gear means normally driven by the other of said shafts, said relative speed limiting means including brake means disposed on a third shaft;

said first and second gear means being operatively associated with said third shaft such that said third shaft is stationary when said first and second shafts are driven at the same speed, said first and second gear means being operatively associated with said third shaft such that said third shaft rotates when said first and second shafts are driven at different speeds;

said first and second shafts being driven at different speeds in the event of a failure of one of said power drive units;

said brake means being operatively associated with said first and second shafts through said first and second gear means and being operative to limit the relative speed between said first and second shafts to a preselected amount; and said torque sensor also including lost motion means driven by said third shaft, said lost motion means limiting the amount of rotation of one of said shafts relative to the other of said shafts in the event of failure of one of said power drive units, said lost motion means thereafter permitting the other of said power drive units to drive both of said shafts through said torque sensor.

24. The shaft relative speed limiting device as defined by claim 23 wherein said first shaft, said second shaft and said third shaft are disposed in generally parallel relation, said first shaft including gear means in gear driving relation to said first gear means of said relative speed limiting means and said second shaft includes gear means in gear driving relation to said second gear means of said relative speed limiting means, said first gear means comprising a ring gear assembly and said second gear means comprising a planetary carrier for a plurality of planetary gears, said ring gear assembly being in gear driving relation to said planetary gears carried by said planetary carrier.

25. The shaft relative speed limiting device as defined by claim 24 including a sun gear on said third shaft in gear driving relation to said planetary gears, said gear means on said first shaft driving said ring gear assembly and said gear means on said second shaft driving said planetary carrier.

26. The shaft relative speed limiting device as defined by claim 23 wherein said third shaft includes an outer gear in gear driving relation to an input gear of said lost motion means, said input gear being integral with a threaded shaft carrying a traveling nut and having interengagement means at opposite ends thereof adapted to cooperate with corresponding interengagement means on opposite ends of said traveling nut, said traveling nut being driven toward one end or the other of said threaded shaft depending upon the direction of rotation of said third shaft.

27. The shaft relative speed limiting device as defined by claim 26 including means for centering said traveling net on said threaded shaft, said centering means including a spring biased button disposed midway between the opposite ends of said threaded shaft.

28. The shaft relative speed limiting device as defined by claim 26 wherein said interengagement means cause said threaded shaft to stop rotating when said traveling net reaches either end of said threaded shaft during rotation of said third shaft, said interengagement means also causing said third shaft to stop rotating when said traveling net reaches either end of said threaded shaft during rotation of said third shaft, said lost motion means thereby limiting the amount of rotation of one of said drive shafts relative to the other of said drive shafts in the event of failure of one of said power drive units.

29. The shaft relative speed limiting device as defined by claim 28 wherein said interengagement means cause said third shaft to stop rotating through said input gear of said threaded shaft and said output gear of said third shaft, the other of said power drive units thereafter driving both of said drive shafts through said gear means disposed in gear driving relation with said ring gear assembly and said planetary carrier.

30. The shaft relative speed limiting device as defined by claim 23 wherein said brake means includes a disc brake applied by a plurality of pivotally mounted flyweights, said flyweights normally extending in generally parallel relation to said third shaft and including spring means applying a biasing force tending to maintain said flyweights in generally parallel relation to said third shaft, said flyweights pivoting outwardly in response to rotation of said third shaft against the biasing force of said spring means to apply said disc brake.

31. The shaft relative speed limiting device as defined by claim 30 wherein said disc brake limits the speed of rotation of said third shaft, said third shaft thereby limiting the relative speed between said first and second shafts through said first and second gear means.

* * * * *